Nov. 22, 1938.    W. R. WEEKS    2,137,884

COFFEE MAKER HANDLE

Original Filed Sept. 25, 1935

Inventor:
Walter R. Weeks,
by Harry E. Dunham
His Attorney.

Patented Nov. 22, 1938

2,137,884

UNITED STATES PATENT OFFICE 2,137,884

COFFEE MAKER HANDLE

Walter R. Weeks, Hamden, Conn., assignor to General Electric Company, a corporation of New York Original application September 25, 1935, Serial No. 42,007. Divided and this application April 28, 1936, Serial No. 76,771

3 Claims. (Cl. 215—100)

This invention relates to coffee makers and it has for its object the provision of an improved handle structure in a device of this character.

More specifically, this invention relates to coffee makers which are provided with a lower bowl and an upper bowl, together with a tube projecting from the upper bowl into the lower bowl so as to connect the two bowls together. A filter upon which the coffee grounds are placed is supported in the upper bowl over the mouth of the tube. In the operation of coffee makers of this character, water is placed within the lower bowl and is heated. The pressure of the water vapor and air above the water level forces the water up through the tube into the upper bowl where the coffee is steeped or infused. When the heat is removed from the lower bowl, the water vapor in the lower bowl condenses and the pressure is thereby reduced sufficiently to cause the coffee infusion in the upper bowl to return through the filter to the lower bowl. After this, the upper bowl is removed and the infusion may then be poured from the lower bowl.

This invention has as one of its objects the provision of an improved handle construction for the lower bowl, whereby the lower bowl may be manipulated to pour the coffee brew from the bowl.

In accordance with this invention, in one form thereof, the handle construction comprises a pair of substantially semi-circular rigid members arranged to embrace opposite sides of the neck of the lower bowl that receives the tubular member attached to the upper bowl. These members are provided with arms extending from the neck in substantially parallel relation with each other, and which are arranged to clasp a portion of a hand-grasping member between them. This grasping member preferably is provided with recesses to receive the parallel arms on the neck grasping portion so as to effect an interlock connection between the handle and the neck grasping portion.

This application is a division of my co-pending application Serial No. 42,007, filed September 25, 1935 and assigned to the same assignee as this invention.

Figure 1:
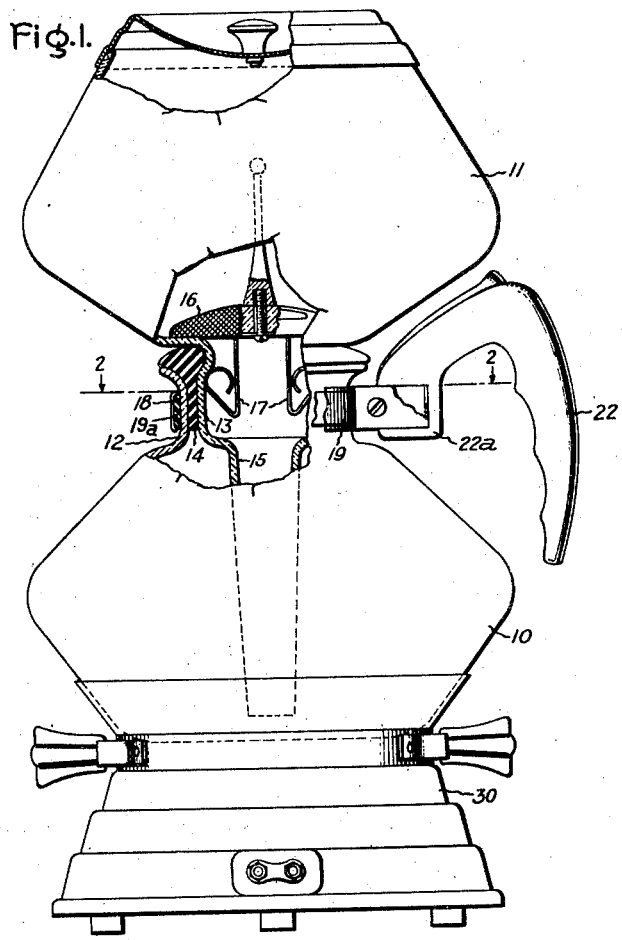
Figure 2:
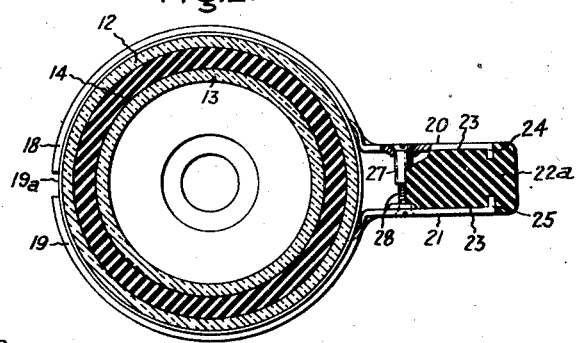
Figure 3:
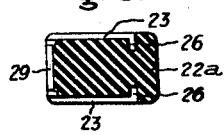

For a more complete understanding of this invention, reference should be had to the accompanying drawing in which Fig. 1 is a vertical elevation of a coffee maker embodying this invention, portions being broken away so as to illustrate certain details of construction; Fig. 2 is an enlarged sectional view taken through the line 2—2 of Fig. 1 and looking in the direction of the arrows; and Fig. 3 is a sectional view of a part of the handle structure used in the coffee maker of Figs. 1 and 2.

Referring to the drawing, this invention has been shown in one form as applied to a coffee makes comprising a lower water heating vessel or bowl 10 and an upper coffee infustion or steeping vessel or bowl 11. The lower bowl 10 is provided at its upper portion with an upright neck 12 within which a depending tubular extension 13 provided at the lower portion of the upper bowl 11 is received. A suitable gasket 14, preferably formed of rubber, is inserted in the neck 12 of the lower bowl and is provided with a centrally arranged aperture to receive the extension 13 provided on the upper bowl 11.

The extension 13 merges into a downwardly tapered tubular member 15, which co-operates with the extension 13 to provide a funnel connection between the lower bowl 10 and the upper bowl 11. Preferably and as shown, the extension 13 and the tapered tube 15 will be formed integrally with the upper bowl 11, and preferably these members will be formed of glass. It is also preferable to form the lower bowl 10 of glass.

Resting on the bottom wall of the upper bowl 11 directly above the opening into the extension 13 is a filter or strainer device 16. The filter is secured to the upper bowl 11 by means of a spring member 17, as fully described in my above-mentioned co-pending application.

The handle structure for the lower bowl arranged in accordance with this invention comprises two substantially semi-circular rigid members 18 and 19 which are arranged to be positioned on opposite sides of the neck 12 of the lower bowl, as clearly shown in Figs. 1 and 2. Preferably, a rubber collar 19a will be positioned about the neck 12 so as to be interposed between the neck and the clamping members 18 and 19. The adjacent ends of the clamping members 18 and 19 on one side of the neck are provided with outwardly extending arms 20 and 21 respectively, which are arranged in substantially parallel relation with each other, as clearly shown in Fig. 2. The arms 20 and 21 are arranged to clamp between them a suitable hand grasping portion 22 of the handle structure. The handle 22, as shown, is provided with a portion 22a which is sandwiched between the two arms 20 and 21 of the neck grasping part of the structure. This portion 22a of the handle is provided with lateral recesses 23 on its opposite sides for receiving the arms 20 and 21, as shown in Figs. 1, 2 and 3. Preferably, inturned end portions 24 and 25 are arranged on the ends of the arms 20 and 21 respectively, as shown in Fig. 2. These end portions are received in relatively deep recesses 26 at the inner ends of the recesses 23. The recesses 23 and 26 are just large enough to receive the arms 20 and 21 and the inturned ends 24 and 25.

The two arms 20 and 21 are rigidly clasped to the handle portion 22a by means of a screw fastening device that comprises a screw member 27 which is directed through an aperture provided for it in the arm 20 and which is provided with an internal thread. The screw fastening means further comprises a screw member 28 which is directed through an aperture provided for it in the arm 21 and which is threaded into the member 27. It will be observed that in view of this construction when the two screw members 27 and 28 are turned inwardly relative to each other, they will draw the clamping arms 20 and 21 tightly into the recesses provided for them in the grasping portion. Preferably, the grasping portion 22a will be provided with a semi-circular recess 29 which receives the screw fastening device 27, 28 in interlocking relation.

In view of the foregoing discussion it will be observed that a very rigid interlocking connection is effected between the handle 22 and the neck grasping arms 18 and 19 whereby all relative movement between these members is precluded.

Preferably, the ends of the neck grasping members 18 and 19 opposite the handle 22 will be spaced apart somewhat, as clearly shown in Fig. 2.

A suitable electric stove 30 is provided for heating the water in the lower bowl 10; and a suitable lid 31 is provided for the upper bowl 11.

In the operation of the device, it will be understood that coffee grounds (not shown) will be placed in the upper bowl on the filter 16, while a suitable quantity of water will be placed in the water heating bowl 10. After the coffee and water have been supplied, heat is applied to the lower bowl by means of the stove 30 so as to bring the water placed therein substantially up to the boiling point. The water vapor that is generated above the level of the water and also the heated air above this level will eventually generate a pressure sufficiently great to cause water in the lower bowl to be forced up through the tube 15 and extension 13 and through the filter 16 into the upper bowl 11 where the coffee grounds are placed. As long as the heat is applied the water will continue to flow into the upper bowl until all of the water in the lower bowl above the level of the lower end of the tube 15 will be forced into the upper bowl. The water will remain in the upper bowl to infuse the coffee until the heat is removed to permit the lower bowl to cool. After this happens, the water vapor in the lower bowl will condense and thereby reduce the pressure therein sufficiently to cause the coffee brew in the upper bowl to flow down into the lower bowl through the coffee grounds and the filter by atmospheric pressure and gravity. After the coffee has been made, the upper bowl is removed and the coffee brew may be poured from the lower bowl by means of the handle 22.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In a coffee maker and the like having a bowl provided at its upper end with an upright neck, a handle for said bowl comprising a member adapted to embrace said neck and having substantially parallel clamping arms at one side of said neck, said arms having portions inturned toward each other at their ends remote from the neck, a grasping member having a portion arranged to be received between said arms, said portion having recesses in its sides to receive said arms and deeper recesses at the ends of said first recesses remote from said neck to receive said inturned ends of said arms, a screw fastening device located between said inturned ends and said neck passed between said arms clamping them to the portion of said grasping member between said arms and said portion having a substantially semi-circular recess receiving said screw fastening device in interlocking relation with it.

2. In a coffee maker and the like having a bowl provided at its upper end with an upright neck, a handle for said bowl comprising a pair of substantially semi-circular rigid members arranged to embrace opposite sides of said neck, each having an arm projecting outwardly therefrom, the two arms being substantially parallel to each other and having at their outer ends remote from said neck portions inturned toward each other, a grasping member having a portion arranged to be received between said arms, said portion having recesses in its sides to receive said arms and deeper recesses at the ends of said first recesses remote from said neck to receive said inturned ends of said arms, a single screw fastening device passed between said arms clamping them to the portion of said grasping member between said arms and said portion having a substantially semi-circular recess receiving said screw fastening device in interlocking relation with it.

3. In a coffee maker and the like having a bowl provided with a neck, a handle construction comprising a grasping member, a member arranged to embrace said neck, said member having substantially parallel clamping portions at one side of said neck arranged to sandwich said grasping member between them, said grasping member having recesses in its side walls for receiving said parallel portions, and deeper recesses at the ends of said first-named recesses, and the ends of said clamping portions remote from said neck being turned inwardly and received in said deeper recesses, and a single fastening device located between said inturned ends and said neck passed between said arms and clamping them to the grasping member.

WALTER R. WEEKS.